US006746724B1

(12) United States Patent
Robertson et al.

(10) Patent No.: US 6,746,724 B1
(45) Date of Patent: Jun. 8, 2004

(54) DUAL PAINT COAT LASER-MARKING LABELING SYSTEM, METHOD, AND PRODUCT

(75) Inventors: John A. Robertson, Chillicothe, OH (US); Edward S. O'Neal, Rockbridge, OH (US)

(73) Assignee: Infosight Corporation, Chillicothe, OH (US)

( * ) Notice: Subject to any disclaimer, the term of this patent is extended or adjusted under 35 U.S.C. 154(b) by 513 days.

(21) Appl. No.: 09/704,077

(22) Filed: Nov. 1, 2000

Related U.S. Application Data

(62) Division of application No. 08/834,465, filed on Apr. 11, 1997.

(51) Int. Cl.[7] .............................. B05D 3/06; B05D 7/22; B23K 26/00
(52) U.S. Cl. ........................ 427/555; 427/556; 427/230; 427/235; 427/239; 219/121.69; 219/121.8; 219/121.85
(58) Field of Search ................................. 427/555, 556, 427/230, 235, 239, 554; 219/121.69, 121.8, 121.85

(56) References Cited

U.S. PATENT DOCUMENTS

| | | | | |
|---|---|---|---|---|
| 4,070,497 A | * | 1/1978 | Wismer et al. | 427/514 |
| 4,326,001 A | * | 4/1982 | Sachs et al. | 427/514 |
| 4,327,283 A | * | 4/1982 | Heyman et al. | 235/487 |
| 4,501,767 A | * | 2/1985 | Iimure | 427/514 |
| 4,515,867 A | * | 5/1985 | Bleacher et al. | 427/555 |
| 4,572,886 A | * | 2/1986 | Reid | |
| 4,578,329 A | * | 3/1986 | Holsappel | |
| 4,595,647 A | * | 6/1986 | Spanjer | |
| 4,600,630 A | * | 7/1986 | Quinn et al. | 428/203 |
| 4,791,267 A | * | 12/1988 | Yokoyama et al. | |
| 4,933,205 A | * | 6/1990 | Duley et al. | 427/555 |
| 5,248,657 A | * | 9/1993 | Bailey et al. | 427/237 |
| 5,397,686 A | * | 3/1995 | Dominick et al. | |
| 5,409,742 A | * | 4/1995 | Arfsten et al. | |
| 5,449,534 A | * | 9/1995 | Oishi et al. | 427/514 |
| 5,523,125 A | * | 6/1996 | Kennedy et al. | 427/555 |
| 5,760,367 A | * | 6/1998 | Rosenwasser et al. | 427/555 |
| 5,798,037 A | * | 8/1998 | Peacock | 427/514 |
| 5,851,335 A | * | 12/1998 | Budnik et al. | 427/555 |
| 5,855,969 A | * | 1/1999 | Robertson | 427/555 |
| 5,985,377 A | * | 11/1999 | Corbett | 427/555 |
| 6,018,859 A | * | 2/2000 | Borzym et al. | 427/236 |

* cited by examiner

*Primary Examiner*—Marianne Padgett
(74) *Attorney, Agent, or Firm*—Mueller and Smith, LPA

(57) ABSTRACT

The present invention is directed to a system for marking objects for their identification which marks survive elevated temperatures of, say, up to 600° to 800° F. or higher, for extended periods of time. The inventive system for marking workpieces for their identification includes a laser that emits a beam select band of radiation and a coating system for application to a workpiece to be marked. The coating system includes two coats of paint, a topcoat and a basecoat which paints have been coated sequentially on the workpiece. The basecoat is an at least partially-cured, laser-blackenable paint which has been marked with fragile product identification indicia by the laser beam, after which a clear topcoat has been applied thereover. The laser generates fragile product identification indicia on the workpiece by its beam being directed onto the basecoat for its blackening to generate the fragile product identification indicia by the selective charring of said basecoat. The clear topcoat seals the fragile product identification indicia. High temperature use of the label can be realized by using a siloxane or other high-temperature paint for both the basecoat and the topcoat.

10 Claims, No Drawings

DUAL PAINT COAT LASER-MARKING LABELING SYSTEM, METHOD, AND PRODUCT

CROSS-REFERENCE TO RELATED APPLICATIONS

This application is a divisional application of U.S. Ser. No. 08/834,465, filed Apr. 11, 1997 now abandoned, the disclosure of which is expressly incorporated herein by reference.

This application is cross-referenceed to commonly-assigned application Ser. No. 08/661,063, filled on Jun. 10, 1996, entititled "$CO_2$ Laser Marking of Coated Surfaces for Product Identification" and applicants' commonly-assigned appplication Ser. No. 08/803,077, filed on Feb. 20, 1997, entitled "Dual Coat Laser-Marking Labeling System, Method, and Product", the disclosures of which are expressly incorporated herin by reference, now U.S. Pat. No. 6,007,929.

STATEMENT REGARDING FEDERALLY SPONSORED RESEARCH

Not applicable.

BACKGROUND OF THE INVENTION

The present invention relates to the marking of product for tracking and identification (e.g., information purposes) and more particularly to using laser marked dual-coated product zones therefor.

There is a need to identify products with high quality bar codes and human-readable information without the use of an adhesive label. For example, welded tubular goods manufacturers (e.g., manufacturers of oil and gas pipeline pipe) desire to identify their products with human-readable data (e.g., heat chemistry of the source plate, pressure testing results, American Petroleum Institute (API) code conformation, etc.), as well as automatic identification (e.g., bar codes) for traceability and handling efficiency.

Paper labels often are unsuitable (as is the case in the aforementioned tubular goods) because they can peel off (e.g., contaminate the pipeline) and they may not be suitable for the environment (e.g., application to hot/wet/oily surfaces or pipes which will be exposed to high temperatures during subsequent coating operations). Bar codes and, to a lesser degree, the hunan-readable characters, require high contrast markings on products which have a wide range of background reflectivity (e.g. shiny to dull black pipe).

Heretofore, Nierenberg (U.S. Pat. No. 4,323,755) vaporizes a pattern (bar code) on glass CRTs for their identification. To improve contrast, the vaporized area can be coated first. Williams (U.S. Pat. No. 5,206,280) discloses a laser markable white pigment composition. Shimokawa (U.S. Pat. No. 4,847,181) proposes a dual layer label that can be laser marked. Gnanamuthu (U.S. Pat. No. 4,716,270) proposes a laser marking system where substrate is etched following laser marking of a label. Norris (U.S. Pat. No. 5,262,613) retrofits a mechanical engraver with a laser. Snakenborg (U.S. Pat. No. 4,946,763) proposes form a pattern in a metal stencil which is covered by a resist material containing a high concentration of metal powder. Resist material is removed by a laser beam to form the pattern. Honaker (U.S. Pat. No. 4,935,288) proposes a laser printable label having a coating of laser printable acrylic. Kiyonari (U.S. Pat. No. 5,063,137) proposes a resin composition for laser marking having an inonmic compound, like an anhydrous metal borate salt, and a resin. Kiyonari (U.S. Pat. No. 5,035,983) proposes a laser marking composition containing a non-black inorganic lead compound. Azuma (U.S. Pat. No. 4,861,620) proposes a pigment layer which can be marked by a laser beam. Herren (U.S. Pat. No. 5,030,551) laser marks ceramic materials coated with a transparent layer of titanium dioxide. Gernier (U.S. Pat. No. 4,985,780) proposes a two carriage assembly for laser marking articles. Robertson (U.S. Pat. No. 5,422,167) proposes a thermally-printable, high temperature-resistant coating for marlking hot bands and like metal products.

Robertson and O'Neal (Ser. No. 08/803,077, cited above) propose to sequentially coat a workpiece to be marked with a basecoat which is refractory to the beam of a laser and a topcoat and, while said topcoat still is wet or tacky, it is ablated by the beam of a laser. The laser beam reveals the basecoat and, by virtue of the visible contrast between the basecoat and topcoat, characters generated by the laser beam are revealed. There is a need, however, for a label which will survive appreciably higher temperatures than are obtained by the formulations disclosed by Robertson and O'Neal. For example, there is a need for the labels to survive 600° F. to 800° F. and higher temperatures for extended periods of time, such as are encountered when epoxy coating/curing the external outside diameter (OD) of pipe.

BRIEF SUMMARY OF THE INVENTION

The present invention is directed to a system for marking objects for their identification which marks survive elevated temperatures of, say, up to 600° to 800° F., for extended periods of time. The inventive system for marldng workpieces for their identification includes a laser that emits a beam select band of radiation and a coating system for application to a workpiece to be marked. The coating system includes two coats of paint, a topcoat and a basecoat, which paints have been coated sequentially on the workpiece. The basecoat is an at least partially-cured, laser-blackenable paint which has been marked with fragile product identification indicia by the laser beam, after which a clear topcoat has been applied thereover. The laser generates fragile product identification indicia on the workpiece by its beam being directed onto the basecoat for its blackening to generate the fragile product identification indicia by the selective charring of said basecoat. The cleartopcoat seals the fragile product identification indicia. High temperature use of the label can be realized by using a siloxane or other high-temperature paint for both the basecoat and the topcoat.

The corresponding inventive method for marking workpieces for their identification starts with providing a laser that emits a beam select band of radiation. A workpiece is coated with a coat of a basecoat which is a laser-blackenable paint and at least partially cured. The at least partially-cured basecoat is contacted with a laser beam to char the basecoat to form fragile product identification indicia thereon. The basecoat then is coated with a clear topcoat and curing of the topcoat (and, if necessary, the basecoat) is effected. By this method, the fragile product identification indicia are protected by the clear topcoat while permitting the product identification indicia to be seen.

The corresponding inventive label bearing product identification indicia is composed of a topcoat and a basecoat which have been coated sequentially on the workpiece. The basecoat is laser-blackenable paint which has been contacted with a laser beam to char the basecoat to form fragile product identification indicia thereon, after which the clear topcoat has been applied over the basecoat to protect said fiagle product identification indicia.

Advantages of the present invention include the ability to rapidly mark virtually any configuration of workpiece, including curved or irregular as well as flat surfaces. Another advantage is the ability to mark both hot and cold surfaces. Yet another advantage is the ability to mark dirty and/or oily surfaces. A further advantage is the ability to mark workpieces on the factory floor with both human readable and machine readable characters. These and other advantages will be readily apparent to those skilled in the art based on the disclosure herein.

DETAILED DESCRIPTION OF THE INVENTION

The dual paint coat portion of the inventive marking system starts with a basecoat that is applied to the workpiece. Application techniques are unlimited and include, for example, spray, roller coat, reverse roller coat, knife coat, dip coat, and the like. Thus, virtually any technique can be used to apply the basecoat to the workpiece. Moreover, with the proper formulation of paints, the surface of the workpiece does not have to be totally cleaned before application of the basecoat.

The action of the laser is to char or carbonize the basecoat upon which it impinges. If the basecoat, a siloxane for example, is exposed to the laser beam when coated, a gray mark results along with massive amounts of carbon dust and soot, which contaminate the mark generated. If the solvent is flashed off, the mark becomes increasingly black, but the carbon dust and soot still is produced. When a label produced in this way eventually cures, the markings are easy to smudge and the label, thereby, is quite fragile. If the solvent in the siloxane basecoat is flashed off and even partially cured (e.g., 600° F. for 5 seconds), the resultant markings become quite black and the soot generation is somewhat reduced; however, the markings remain fragile and smudge easily.

In order to produce a smudge-free label with only one coat, it is necessary to fully cure the coating for an extended period of time, say 500° F. for 2 minutes. Unfortunately, such a curing cycle is not practical for many production processes (e.g., massive metal parts such as pipe).

The invention, then, takes advantage of the ability to produce full black markings on the basecoat by the action of a laser (for example, a $CO_2$ laser) via a process that is within the parameters of most production processes, but which effectively traps the fragle, dusty markings and protects such dusty markings from being smudged or otherwise contaminated. This entrapment is accomplished by overcoating the laser-marked basecoat with a compatible clear topcoat. The clear topcoat, when fully cured, entrains the loose carbon markings and, with the basecoat, produces a waterproof, robust label which can survive much higher temperatures such as are encountered during normal processing of a variety of workpieces (which subsequent exposure to high temperatures, in effect, results in full cure of the siloxane basecoat and topcoat).

Obviously, black and white colors provide the optimum contrast. Thus, the preferred basecoat with be white in color. However, other basecoat colors can be used provided that they are matched to the frequency of a bar code scanning laser beam (as will be described further below), if bar code scanning is desired of the labels. Such dual coating technique provides readily readable (both human and machine) characters regardless of the color of the workpiece being labeled. Thus, the workpiece can be any color and its surface exhibit virtually any gloss, and the inventive labeling system will provide the same high quality and consistently readable labels. Also, the temperature of the workpiece can vary greatly and properly formulated paints still adhere thereto.

Thus, the inventive painted label may, in the case of large diameter pipe, typically be about 4"×6" and can be made to contain human readable alphanumeric characters, a logo (graphics), and/or a conventional picket-fence bar code. Obviously, printing this much data and graphics requires a high resolution printing technique. Nevertheless, such information can be quite valuable to the manufacturer as well as to the user of the pipe whether the information is to be read by a person or automatically, e.g., by a bar code scanner.

The laser preferably is a $CO_2$ laser because sealed units with long (>10,000 operating hours) lives are available commercially. While use of conventional dual axis scanning lasers fitted with two mirrors and galvanometers (so-called X-Y galvo systems) can be practiced, the laser beam preferably is scanned in one direction only (Y-axis or Y direction) while the relative motion of the surface to be marked and/or the laser optics provides X-axis or X direction effective movement of the surface to be marked. Scanning in one direction only greatly reduces the cost of the galvanometer system compared to an X/Y two galvanometer plus flat field lens system which can position a focused beam over a relatively large area. Raster scanning, although slower for typical patterns, also permits the marking of long objects (such as, for example, large bar code tags) without error prone jogging and splicing within the marked image (bar code). The speed of the X direction (stepping) can be accelerated over blank areas (areas not to be marked) to increase the overall speed of the madding cycle. The scanning angle, Y scanning, also can be varied as is appropriate for the marked height which also increases the overall speed of the laser scan. Details on such raster scanning laser beams can be found in application Ser. No. 08/661,063, cited above.

With respect to the paint that is used for the basecoat and the topcoat of the novel label, the binder preferably comprises a phenyl siloxane resin which provides stability at the elevated temperatures to which the label may be subjected. Siloxane resin binders typically are heat-cured in the presence of catalysts with typical catalysts being selected from acids, bases, and the salts of metals, for example, zinc, tin, lead, or chromium octoates. Siloxane resins can be blended or chemically combined with other film-forming polymers provided that the ultimate cured phenyl-substituted silicone binder is stable at the hot metal temperatures of use of the inventive labels. Phenyl-substituted, resins are well known in the art, such as represented by D. H. Solomon, *The Chemistry of Organic Film Formers*, Second Edition, Robert E. Krieger Publishing, Inc., pp. 334 et seq. (1977), the disclosure of which is expressly incorporated herein by reference. It should be understood, however, that certain polyimide resins also are stable at the temperatures of operation and similarly may be used in formulating a paint for use in the present invention.

For the basecoat, preferably an opacifying amount of titanium dioxide pigment also is included for providing opacification as well as a white color to the paint, again so that the contrast between the laser-generated fragile product identification indicia and the background of the paint enables, for example, optical scanning. Titanium dioxide pigment is stable at the elevated temperatures of operation. For the clear topcoat, opacifying pigments are omitted from the formulation. Organic solvent typical of such paints is used in conventional fashion.

The preferred basecoat conveniently can be subjected to heated air flow solvent expulsion conditions of, say, at about 300° F. air flow over the basecoat for up to about 5 seconds or longer. Thereafter, it can be marked with the $CO_2$ laser to produce fragile product identification indicia. Multiple layers of the paint also can be used as is necessary, desirable, or convenient. A representative basecoat with a phenyl siloxane resin binder which is found to be quite advantageous for use in the present invention is white SPI 011 paint (Advanced Packaging and Products Company, Gardena Calif. 90248).

The topcoat preferably is of a substantially similar composition as the basecoat in order to promote intercoat adhesion and for the outstanding high-temperature properties exhibited by the preferred phenyl siloxane basecoat. The topcoat, however, is clear. Thus, opacifying pigments are avoided in formulating such clear topcoats. The clear topcoat entrains the loose carbon markings and, when both coatings are dry, they produce a waterproof, robust label which can survive much higher temperatures, because, in effect, subsequent exposure to high temperature results in full cure of the siloxane coatings. In order to not disturb the fragile product identification indicia created by the laser impinged basecoat, the topcoat preferably in spray applied over the basecoat.

A representative topcoat with a phenyl siloxane resin binder which is found to be quite advantageous for use in the present invention is clear SPI 151 paint (Advanced Packaging and Products Company, Gardena Calif. 90248). A combination of the preferred white phenyl siloxane basecoat and clear topcoat have proven suitable for ambient marking on large metal surfaces after a 5 second, 300° F. hot air "cure". The resultant label, when flashed, will survive subsequent exposure to 800° F. without darkening or loss or contrast.

Markings of line widths of down to 0.006 inches (0.15 mm) has been achieved. This means that the smallest "x" dimensions (narrowest line or space) must be larger than 0.006 inches. Robust codes should utilize bars which are (near integer) multiples of this line width.

Workpieces to be labeled in accordance with the present invention can be composed of metal, wood, plastic (optionally fiber reinforced), composite, ceramic, glass, or any other substance capable of being coated. Of course, substrates sensitive to the heat generated by the laser may find limited utility in the practice of the present invention. Workpieces can be rigid or flexible, of any geometry (flat or curvilinear), and oriented horizontally, vertically, or canted an angle, and still find use in the practice of the present invention. The present invention is especially adapted to mark or label large workpieces that are exposed to high temperatures during subsequent processing. For example, pipe can marked on its interior and then subjected to elevated temperature in order to cure an OD epoxy coating curing.

It also has been found advantageous to employ a flew of tangential air flow during the laser marking step in order to carry away large soot particles which may be produced so that such large soot particles do not contaminate the unmarked white label surface.

While the invention has been described and illustrated in connection with certain preferred embodiments thereof, it will be apparent to those skilled in the art that the invention is not limited thereto. Accordingly, it is intended that the appended claims cover all modifications which are within the spirit and scope of this invention. All references cited herein are expressly incorporated herein by reference.

We claim:

1. A method for marking workpieces for identification thereof, which comprises the steps of:
   (a) providing a laser that emits a beam comprising a select band of radiation;
   (b) coating said workpiece with a coat of a basecoat which is a laser-blackenable paint;
   (c) at least partially curing said basecoat;
   (d) contacting said at least partially-cured basecoat with said laser beam to char said basecoat to form fragile product identification indicia thereon; and
   (e) overcoating said basecoat with a coat of a clear topcoat;
   whereby, said fragile product identification indicia are protected by said clear topcoat while permitting said product identification indicia to be seen.

2. The method of claim 1, wherein said product identification indicia are humanly or machine readable.

3. The method of claim 2, wherein said basecoat is provided to be white in color.

4. The method of claim 1, wherein said laser provided is a $CO_2$ laser.

5. The method of claim 4, wherein said $CO_2$ laser is a raster-scanning infrared laser beam emitting $CO_2$ laser that is raster-scanned in the Y-axis; and said workpiece is moved in the X-axis for said laser beam to form said product identification indicia.

6. The method of claim 1, wherein said product identification indicia formed in said step (d) includes one or more of human readable and machine readable information formed from one or more of alphanumeric characters and graphic characters.

7. The method of claim 1, wherein the workpiece is a pipe having an inside diameter, which pipe is coated on said inside diameter in said steps (b) and (e).

8. The method of claim 1, wherein said laser in said step (d) is connected to a pair of galvanometer or stepper motor-driven mirror systems so as to scan in both the X-axis and the Y-axis.

9. The method of claim 1, which further includes the step of:
   blowing air across the basecoat concomitant with or following said step (d) to carry away any soot particles which are produced by said laser beam contacting said basecoat.

10. The method of claim 1, which additional comprises the step of:
    (f) curing said topcoat and, if necessary, said basecoat.

* * * * *